(12) United States Patent
Chun (10) Patent No.: US 9,012,053 B2
(45) Date of Patent: Apr. 21, 2015

(54) ELECTRODE ASSEMBLY AND RECHARGEABLE BATTERY INCLUDING THE SAME

(75) Inventor: Kwan-Sic Chun, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/067,360

(22) Filed: May 26, 2011

(65) Prior Publication Data

US 2012/0009450 A1      Jan. 12, 2012

(30) Foreign Application Priority Data

Jul. 12, 2010   (KR) .......................... 10-2010-0067089

(51) Int. Cl.

| | |
|---|---|
| H01M 4/00 | (2006.01) |
| H01M 6/10 | (2006.01) |
| H01M 2/10 | (2006.01) |
| H01M 6/00 | (2006.01) |
| H01M 10/00 | (2006.01) |
| H01M 4/02 | (2006.01) |
| H01M 4/13 | (2010.01) |
| H01M 2/16 | (2006.01) |
| H01M 2/26 | (2006.01) |

(Continued)

(52) U.S. Cl.
CPC .............. *H01M 2/263* (2013.01); *H01M 2/022* (2013.01); *H01M 2/023* (2013.01); *H01M 10/0431* (2013.01)

(58) Field of Classification Search
CPC . H01M 2/263; H01M 2/022; H01M 10/0431; H01M 2/023

USPC .............................. 429/94, 96, 122, 211, 247
See application file for complete search history.

(56) References Cited

U.S. PATENT DOCUMENTS

| | | |
|---|---|---|
| 2,291,110 A | 1/1960 | Crowley et al. |
| 3,507,703 A | 4/1970 | Heredy |

(Continued)

FOREIGN PATENT DOCUMENTS

| | | |
|---|---|---|
| CN | 1354531 A | 6/2002 |
| CN | 1753230 A | 3/2006 |

(Continued)

OTHER PUBLICATIONS

Office Action issued in corresponding Korean application, 10-2010-0067089, dated Sep. 23, 2011.

(Continued)

*Primary Examiner* — Patrick Ryan
*Assistant Examiner* — Aaron Greso
(74) *Attorney, Agent, or Firm* — Lee & Morse, P.C.

(57) ABSTRACT

An electrode assembly and a rechargeable battery including the same, the electrode assembly including a first electrode, a second electrode, and a separator interposed therebetween, wherein the first electrode, the second electrode, and the separator are spiral-wound in a jelly-roll structure, the first electrode includes at least two first uncoated regions separated from each other and a first tab coupled to one of the first uncoated regions and a second tab coupled to another of the first uncoated regions, the first tab and the second tab protruding from one side of the jelly-roll structure, the first tab is disposed near a center of the jelly-roll structure and the second tab is disposed near an outer circumference of the jelly-roll structure, and a width of the first tab is smaller than a width of the second tab.

19 Claims, 5 Drawing Sheets

(51) Int. Cl.
   *H01M 10/04*   (2006.01)
   *H01M 2/02*   (2006.01)

(56) References Cited

U.S. PATENT DOCUMENTS

| | | | |
|---|---|---|---|
| 3,607,417 | A | 9/1971 | McRae et al. |
| 4,816,352 | A | 3/1989 | Gordon |
| 7,060,387 | B2 | 6/2006 | Kim et al. |
| 7,276,313 | B2 * | 10/2007 | Watanabe et al. ............. 429/159 |
| 2002/0061435 | A1 | 5/2002 | Hisai |
| 2004/0161662 | A1 * | 8/2004 | Kim et al. ..................... 429/94 |
| 2004/0202924 | A1 | 10/2004 | Tao et al. |
| 2005/0142436 | A1 | 6/2005 | Arai et al. |
| 2006/0240319 | A1 | 10/2006 | Chun |
| 2010/0178559 | A1 * | 7/2010 | Mao et al. ..................... 429/211 |

FOREIGN PATENT DOCUMENTS

| | | | |
|---|---|---|---|
| CN | 2845189 A | 12/2006 | |
| EP | 1207565 * | 5/2002 | ............. H01M 2/26 |
| EP | 1207565 A2 | 5/2002 | |
| EP | 1717894 A1 | 11/2006 | |
| GB | 1215225 | 12/1970 | |
| JP | 09-213361 | 8/1997 | |
| JP | 11-185726 A | 7/1999 | |
| JP | 11-233148 A | 8/1999 | |
| JP | 11-317218 A | 11/1999 | |
| JP | H11-317218 * | 11/1999 | ............. H01M 4/02 |
| JP | 2000-251927 A | 9/2000 | |
| JP | 2000-285898 A | 10/2000 | |
| JP | 2001-185119 A | 7/2001 | |
| JP | 2001-202945 A | 7/2001 | |
| JP | 2002-157991 A | 5/2002 | |
| JP | 2004-199938 | 7/2004 | |
| JP | 2005-209494 | 8/2005 | |
| KR | 10-2003-0031820 A | 4/2003 | |
| KR | 102006022128 * | 3/2006 | ............. H01M 10/04 |
| WO | WO 03/001617 A2 | 1/2003 | |

OTHER PUBLICATIONS

European Search Report in EP 11173258.2-2119/2408056, dated Mar. 12, 2012 (Chun).
European Search Report in EP 11173258.2-2119, dated Dec. 2, 2011 (Chun).
Japanese Office Action in JP 2010-262807, dated May 7, 2013 (Chun).
Japanese Office Action in JP 2010-262807, dated Jan. 8, 2013 (Chun).
Chinese Office Action dated Jan. 9, 2014.
Search Report dated Aug. 5, 2014 in corresponding European Patent Application No. 11 173 258.2.
Office Action mailed Jul. 30, 2014 in corresponding Chinese Patent Application No. 201110189392.7.
Office Action mailed Apr. 15, 2014 in corresponding Chinese Patent Application No. 201110189392.7.

* cited by examiner

ELECTRODE ASSEMBLY AND RECHARGEABLE BATTERY INCLUDING THE SAME

BACKGROUND

1. Field

Embodiments relate to an electrode assembly and a rechargeable battery including the same.

2. Description of the Related Art

Rechargeable batteries may be charged and discharged, unlike primary batteries that cannot be charged. Small capacity rechargeable batteries maybe used for small portable electronic devices e.g., mobile phones, laptop computers, and camcorders. Large capacity batteries may be used as power sources for, e.g., driving motors of hybrid vehicles, etc.

In general, the rechargeable battery may include an electrode assembly made of a positive electrode, a negative electrode, and a separator interposed therebetween. The electrode assembly may have a stacked structure in which the positive electrode, the separator, and the negative electrode are sequentially deposited, or a jelly-roll structure in which the positive electrode, the separator, and the negative electrode are spiral-wound, according to the use and the object thereof.

The electrode assembly of the jelly-roll structure may be accommodated in a case of, e.g., a cylindrical type, a prismatic type, a pouch type, etc. A cross-section of the electrode assembly of the jelly-roll structure may be, e.g., circular or oval, and may include electrode tabs respectively coupled to the positive electrode and the negative electrode. A multi-tab including a plurality of electrode tabs may be used, as the demand for high power rechargeable batteries has recently increased.

The above information disclosed in this Background section is only for enhancement of understanding of the background of the described technology and therefore it may contain information that does not form the prior art that is already known in this country to a person of ordinary skill in the art.

SUMMARY

Embodiments are directed to an electrode assembly and a rechargeable battery including the same.

At least one of the above and other features and advantages may be realized by providing an electrode assembly including a first electrode, a second electrode, and a separator interposed therebetween, wherein the first electrode, the second electrode, and the separator are spiral-wound in a jelly-roll structure, the first electrode includes at least two first uncoated regions separated from each other and a first tab coupled to one of the first uncoated regions and a second tab coupled to another of the first uncoated regions, the first tab and the second tab protruding from one side of the jelly-roll structure, the first tab is disposed near a center of the jelly-roll structure and the second tab is disposed near an outer circumference of the jelly-roll structure, and a width of the first tab is smaller than a width of the second tab.

The first electrode may have a band shape, and the two first uncoated regions may be disposed on end edges of the first electrode.

The first electrode may have a band shape, and the one of the first uncoated regions may be on a center portion of the first electrode and the other of the first uncoated regions may be on an end edge of the first electrode.

The width of the first tab may equal $2\pi r \times 0.065$, r being a radius of the bottom surface of the jelly-roll structure.

The width of the first tab may be about 2.8 mm to about 7 mm.

The width of the second tab may equal $2\pi r \times 0.07$, r being a radius of the bottom surface of the jelly-roll structure.

The width of the second tab may be about 5.1 mm to about 11 mm.

A thickness of the first tab may be smaller than a thickness of the second tab.

The thickness of the first tab may be about 0.05 mm to about 0.15 mm.

The thickness of the second tab may be about 0.1 mm to about 0.2 mm.

The first electrode may be a positive electrode.

The second electrode may include at least two second uncoated regions and a third tab on one of the second uncoated regions and a fourth tab on another of the second uncoated regions, the third tab and the fourth tab protruding to a side opposite to the one side from which the first tab and the second tab protrude, the third tab may be disposed near a center of the jelly-roll structure and the fourth tab may be disposed near an outer circumference of the jelly-roll structure, and a width of the third tab may be smaller than a width of the fourth tab.

The width of the third tab may equal $2\pi r \times 0.065$, r being a radius of the bottom surface of the jelly-roll structure.

The width of the fourth tab may equal $2\pi r \times 0.07$, r being a radius of the bottom surface of the jelly-roll structure.

At least one of the above and other features and advantages may also be realized by providing a rechargeable battery including an electrode assembly, the electrode assembly including a first electrode, a second electrode, and a separator interposed therebetween; a case for receiving the electrode assembly, and a cap assembly coupled with the case and electrically connected to the electrode assembly, wherein the first electrode, the second electrode, and the separator are spiral-wound in a jelly-roll structure having a cylindrical shape, the first electrode includes at least two first uncoated regions separated from each other and a first tab coupled to one of the first uncoated regions and a second tab coupled to another of the first uncoated regions, the first tab and the second tab protruding from one side of the jelly-roll structure, the first tab is disposed near a center of the jelly-roll structure and the second tab is disposed near an outer circumference of the jelly-roll structure, and a width of the first tab is smaller than a width of the second tab.

The width of the first tab may equal $2\pi r \times 0.065$, the width of the second tab may equal $2\pi r \times 0.07$, and r may be a radius of a bottom surface of the jelly-roll structure.

The width of the first tab may be about 2.8 mm to about 7 mm, and the width of the second tab may be about 5.1 mm to about 11 mm.

A thickness of the first tab may be smaller than a thickness of the second tab.

The second electrode may include at least two second uncoated regions and a third tab on one of the second uncoated regions and a fourth tab on another of the second uncoated regions, the third tab and the fourth tab protruding to a side opposite to the one side from which the first tab and the second tab protrude, and the third tab may be disposed near a center of the jelly-roll structure and the fourth tab may be disposed near an outer circumference of the jelly-roll structure, and a width of the third tab may be smaller than a width of the fourth tab.

The width of the third tab may equal $2\pi r \times 0.065$, the width of the fourth tab may equal $2\pi r \times 0.07$, and r may be a radius of a bottom surface of the jelly-roll structure.

A thickness of the third tab may be smaller than a thickness of the fourth tab.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0067089, filed on Jul. 12, 2010, in the Korean Intellectual Property Office, and entitled: "Electrode Assembly and Rechargeable Battery Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 1:
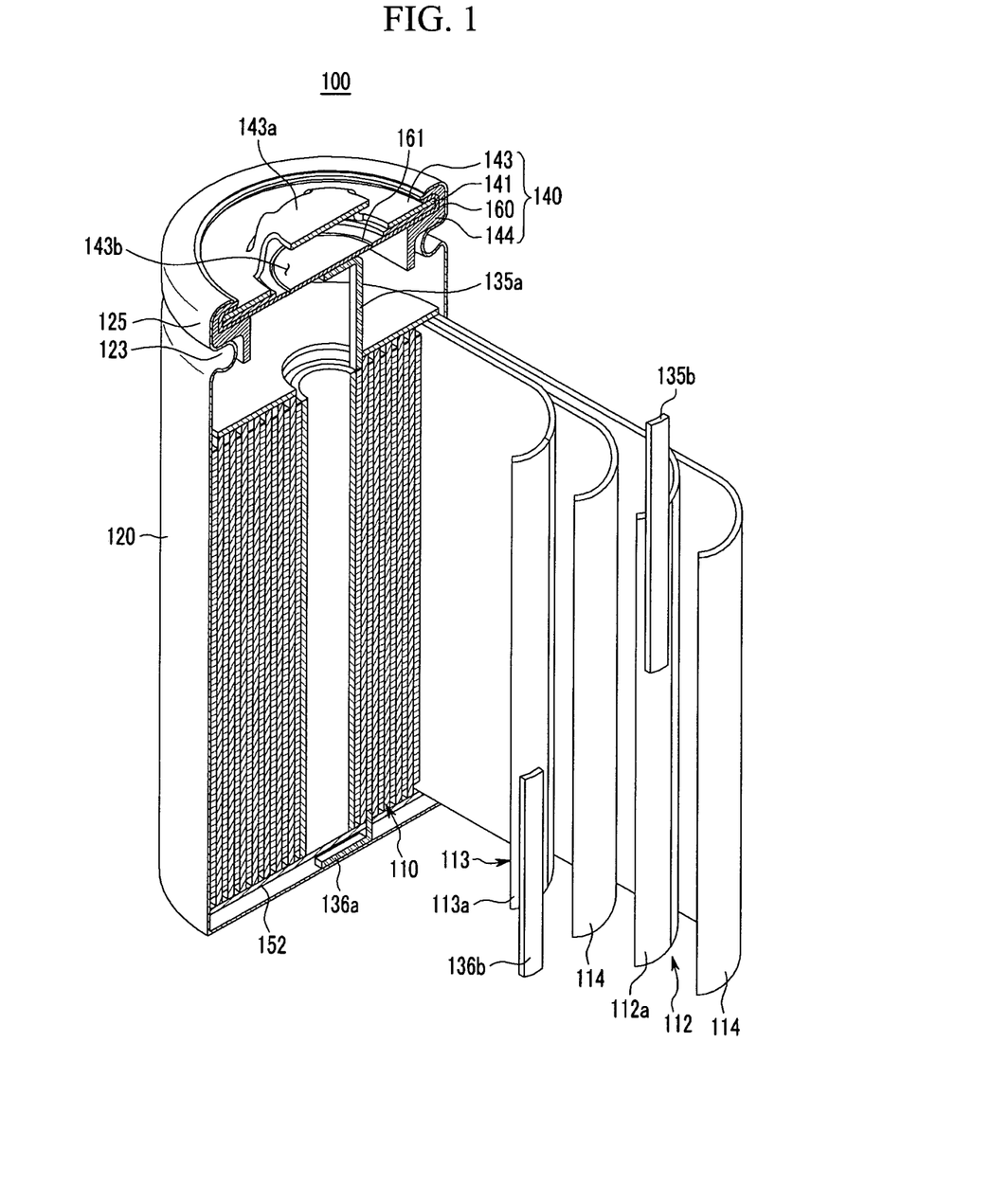
FIG. 1 illustrates a cut-away perspective view of a rechargeable battery according to an embodiment.

FIG. 1 illustrates a cut-away perspective view of a rechargeable battery according to an embodiment. Referring to FIG. 1, a rechargeable battery 100 according to the present embodiment may include an electrode assembly 110 for generating a current, a case 120 for receiving the electrode assembly 110, and a cap assembly 140 coupled to the case 120 and being electrically connected to the electrode assembly 110.

The electrode assembly 110 may include a first electrode 112, a second electrode 113, and a separator 114 interposed therebetween. In an implementation, the first electrode 112 may be a positive electrode and the second electrode 113 may be a negative electrode, however a polarity of the first electrode and the second electrode may be reversed. The positive electrode 112, the negative electrode 113, and the separator 114 may be connected in one direction thereby forming a band shape. The electrode assembly 110 may be formed in a jelly-roll structure in which the positive electrode 112, the negative electrode 113, and the separator 114 are continuously deposited and spiral-wound. In an implementation, a longitudinal cross section of the jelly-roll structure may be round.

The positive electrode 112 may include a coating portion in which a positive electrode active material is coated on a current collector made of, e.g., aluminum. The positive electrode 112 may include a positive electrode uncoated region 112a where the active material is not coated. The negative electrode 113 may include a coating portion in which a negative electrode active material is coated on a current collector made of, e.g., copper or aluminum. The negative electrode 113 may include a negative electrode uncoated region 113a where the active material is not coated. A first positive electrode tab 135a and a second positive electrode tab 135b may be formed in or coupled to the positive electrode uncoated region 112a. A first negative electrode tab 136a and a second negative electrode tab 136b may be formed in or coupled to the negative electrode uncoated region 113a.

In an implementation, the case 120 may have a cylindrical shape with one side thereof open to facilitation insertion of the electrode assembly 110 therethrough. The case 120 may be made of a conductive metal, e.g., aluminum, an aluminum alloy, or nickel-plated steel. The case 120 may be connected to the negative electrode tabs 136a and 136b, thereby functioning as a negative electrode terminal of the rechargeable battery 100.

The cap assembly 140 may be fixed through, e.g., clamping, after fitting the same in the opened side of the case 120. In this process, a beading portion 123 and a clamping portion 125 may be formed along a circumference of an upper portion of the case 120. The cap assembly 140 may include a cap plate 143, a vent plate 160, a gasket 144, and a safety plate 141.

The cap plate 143 may include a protrusion 143a protruding upwardly and an exhaust port 143b penetrating inside the case 120. Also, a notch 161 may be formed in the vent plate 160 under the cap plate 143. The notch 161 may be fractured when a pressure inside the case 120 exceeds a predetermined pressure, thereby suppressing an explosion caused an excess increase of the inner pressure of the rechargeable battery 100. The vent plate 160 may be electrically connected to the positive electrode 112 through the positive electrode tabs 135a and 135b. In an implementation, the positive electrode tabs 135a and 135b may be directly connected to the vent plate 160, however the embodiments are not limited thereto; and the vent plate 160 may include a middle member (not illustrated) and may be connected to the positive electrode tab 135a and 135b through the middle member.

The safety plate 141 may be disposed between the cap plate 143 and the vent plate 160 and may include a positive temperature coefficient element. The positive temperature coefficient element may be an element whose electrical resistance may be quickly increased if a temperature of the element exceeds a predetermined temperature, thereby interrupting a flow of a charge or discharge current when a temperature of the rechargeable battery 100 reaches or exceeds a predetermined temperature.

The gasket 144 may enclose or surround a circumference of the cap plate 143, the vent plate 160, and the safety plate 141. The gasket 144 may be made of an insulating material, thereby insulating the cap assembly 140 from the case 120.

The cap assembly 140 and the circumferential structure is merely an exemplary structure, and the embodiments are not limited to this structure.

Figure 2:
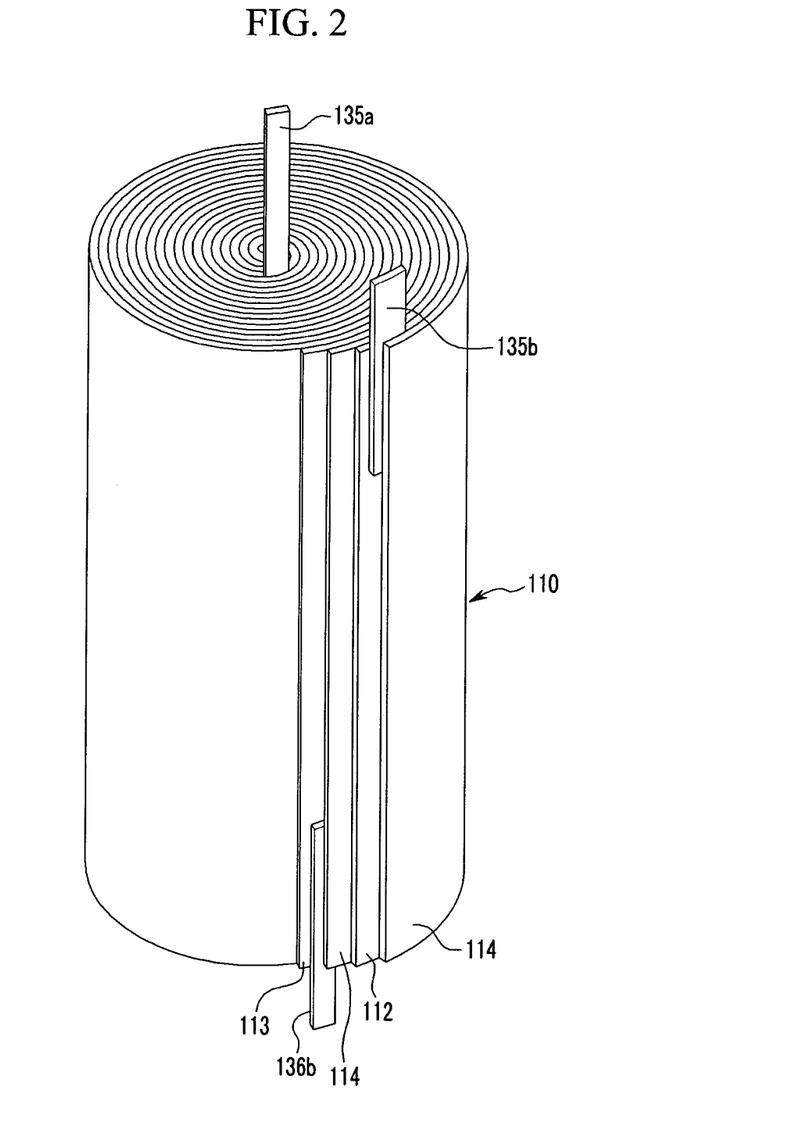
FIG. 2 illustrates a perspective view of an electrode assembly of FIG. 1.
Figure 3:
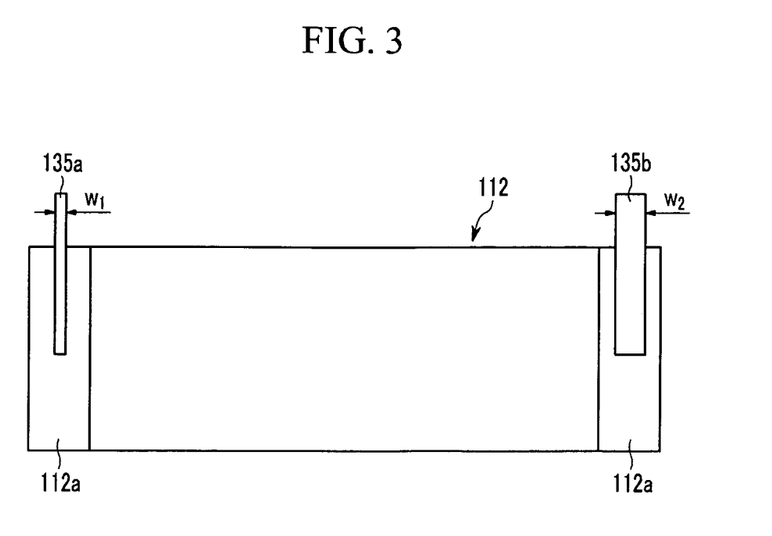
FIG. 3 illustrates a schematic view showing an arrangement of a positive electrode tab of the electrode assembly of FIG. 2.

FIG. 2 illustrates a perspective view of an electrode assembly of FIG. 1. FIG. 3 illustrates a schematic view showing an arrangement of a positive electrode tab of the electrode assembly of FIG. 2. The electrode assembly 110 according to the present embodiment will be described with reference to these drawings.

As described above, the electrode assembly 110 according to the present embodiment may have the jelly-roll structure in which the separator 114, the positive electrode 112, the separator 114, and the negative electrode 113 are sequentially deposited and spiral-wound. In an implementation, the electrode assembly 110 may have a cylindrical shape.

In the present embodiment, the electrode assembly 110 may have a band shape in which the positive electrode 112 and the negative electrode 113 are extended in one direction for forming the jelly-roll structure. The positive electrode 112 and the negative electrode 113 may respectively include the coating region where the active material is coated and the uncoated region (112a and 113a) where the active material is not coated. The positive electrode 112 and the negative electrode 113 may further include the positive electrode tabs 135a and 135b and the negative electrode tabs 136a and 136b, respectively, on the uncoated regions and protruding to one or opposing sides of the electrode assembly 110. The positive electrode tabs 135a and 135b and the negative electrode tabs 136a and 136b may be made of a conductive metal, e.g., aluminum or nickel. The positive electrode tabs 135a and 135b and the negative electrode tabs 136a and 136b may protrude to opposite sides of the electrode assembly 110, however the embodiments are not limited thereto.

In an implementation, a structure of the positive electrode 112 and the negative electrode 113 may be similar to each other such that the descriptions thereof focus on the positive electrode 112 and the positive electrode tabs 135a and 135b according to the present embodiment with reference to the figures.

As illustrated in FIG. 3, the positive electrode uncoated regions 112a may be formed on end edges of the positive electrode 112; and the first positive electrode tab 135a and the second positive electrode tab 135b may be respectively formed on the positive electrode uncoated regions 112a. When the positive electrode 112 is spiral-wound along with the negative electrode 113 and the separator 114 thereby forming the electrode assembly 110 having the jelly-roll structure, the first positive electrode tab 135a may be disposed at a center portion of the electrode assembly 110 and the second positive electrode tab 135 may be disposed at an outer circumference of the electrode assembly 110, as illustrated in FIG. 2.

In an implementation, the electrode assembly 110 may be formed with the cylindrical jelly-roll structure such that the center portion of the electrode assembly 110 has a tighter curvature than that of the outer circumference. As described above, inner stress may be applied to the center portion of the electrode assembly 110 according to the formation of the tight curvature. In addition, the first positive electrode tab 135a may be disposed at the center portion of the electrode assembly 110 such that the inner stress may be further increased. When the inner stress generated according to the formation of the tight curvature and the first positive electrode tab 135a is considerable, the electrode assembly 110 may be deformed.

In an implementation, a width $w_1$ of the first positive electrode tab 135a disposed at the center portion of the electrode assembly 110 may be smaller than a width $w_2$ of the second positive electrode tab 135b at the outer circumference of the electrode assembly 110. As described above, the widths of the first positive electrode tab 135a and the second positive electrode tab 135b may be different from each other such that the inner stress generated due to the tight curvature at the center portion may be minimized; and deformation of the electrode assembly 110 according to the inner stress may be suppressed. In addition, output current may be maximized through the second positive electrode tab 135b such that the high power may be maintained.

Figure 4:
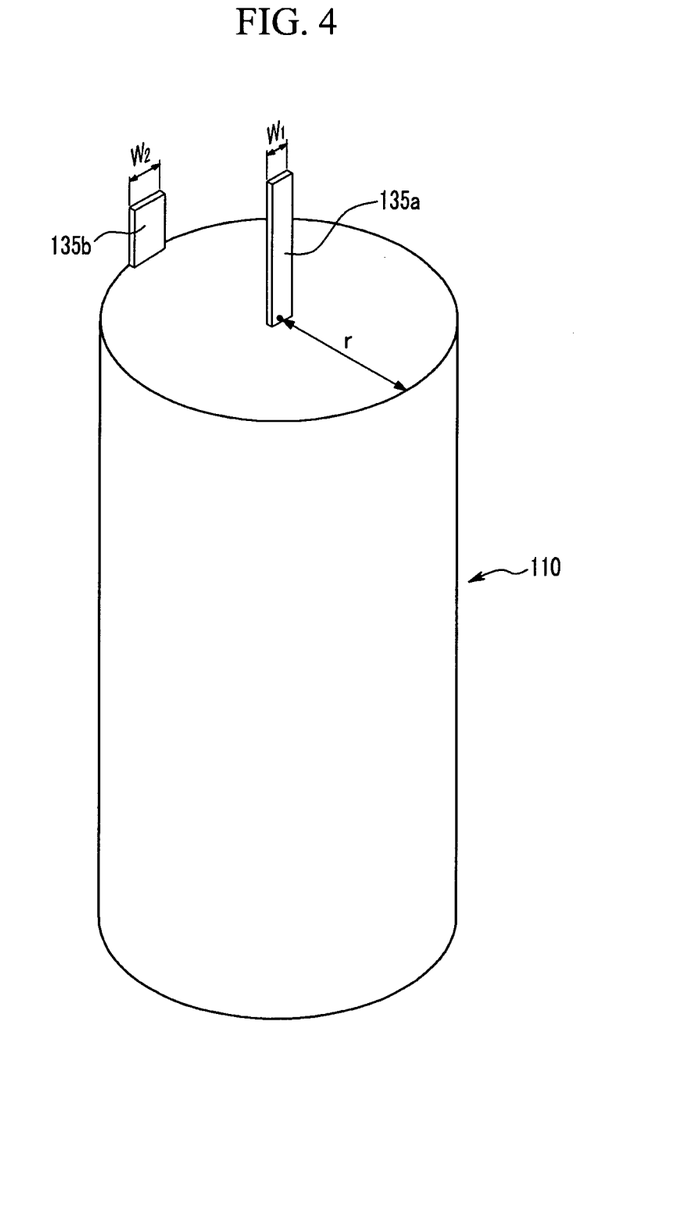
FIG. 4 illustrates a schematic perspective view of the electrode assembly of FIG. 2.

FIG. 4 illustrates a schematic perspective view of the electrode assembly of FIG. 2. Hereafter, a detailed description of the widths $w_1$ and $w_2$ of the positive electrode tab 135a and 135b will be described. As shown in FIG. 4, when a radius of a bottom surface of the jelly-roll structure of the cylinder is referred to as "r", a relation equation of the width $w_1$ and $w_2$ of the first positive electrode tab 135a and the second positive electrode tab 135b for r may be represented. For example, the relation equation in proportion to the radius or circumference of the jelly-roll structure may be represented as $2\pi r \times a$. Here, a may be a constant determined according to a position of the positive electrode tab 135a and 135b; and a may be different for the first positive electrode tab 135a and the second positive electrode tab 135b. For example, a may be about 0.065 when the first positive electrode tab 135a is positioned at the center portion of the jelly-roll structure and may be about 0.07 when the second positive electrode tab 135b is positioned at the outer circumference of the jelly-roll structure.

For example, when the first positive electrode tab 135a and the second positive electrode tab 135b are applied to a small battery having the jelly-roll structure with a bottom surface radius of about 7 mm to 10 mm, the first positive electrode tab 135a may have a width $w_1$ of about 2.8 mm to about 4 mm; and the second positive electrode tab 135b may have a width $w_2$ of about 3 mm to about 4.4 mm. When the first positive electrode tab 135a and the second positive electrode tab 135b are applied to a small battery having the jelly-roll structure with a bottom surface radius of about 12.5 mm to about 25 mm, the first positive electrode tab 135a may have a width $w_1$ of about 5.1 mm to about 10 mm; and the second positive electrode tab 135b may have a width $w_2$ of about 5.5 mm to about 11 mm.

In a small battery, the width $w_2$ of the second positive electrode tab 135b may be larger to maximize the output current through the second positive electrode tab 135b. In a large battery, the width $w_1$ of the first positive electrode tab 135a may be smaller to minimize the inner stress of the electrode assembly 110. However, the width $w_1$ and $w_2$ of the first positive electrode tab 135a and the second positive electrode tab 135b are not limited thereto, and may be determined as appropriate values according to process conditions. In an implementation, the width $w_1$ of the first positive electrode tab 135a may be determined as an appropriate value, e.g., about 2.8 mm to about 10 mm, preferably about 2.80 mm to about 7 mm, while the width $w_2$ of the second positive electrode tab 135b may be determined as an appropriate value, e.g., about 3 mm to about 11 mm, preferably about 5.1 mm to about 11 mm.

As described above, in the present embodiment, the width $w_1$ of the first positive electrode tab 135a may be smaller than the width $w_2$ of the second positive electrode tab 135b. Also, the width may be controlled by considering a size of the electrode assembly 110 and process conditions according to the desired output.

In an implementation, thicknesses of the first positive electrode tab 135a and the second positive electrode tab 135b may be different from each other. For example, the thickness of the first positive electrode tab 135a may be about 0.05 mm to about 0.15 mm and the thickness of the second positive electrode tab 135b may be larger than the thickness of the first positive electrode tab 135a, e.g., about 0.1 mm to about 0.2 mm. As described above, the thickness of the first positive electrode tab 135a may be smaller than the thickness of the second positive electrode tab 135b such that the inner stress may be decreased at the center portion of the electrode assembly 110 and deformation according thereto may be suppressed. Also, the output current through the second positive electrode tab 135b may be maximized.

As described above, the structure of the positive electrode tabs 135a and 135b are described focusing on the positive electrode 112, however this may be equally applied to the negative electrode 113 and negative electrode tabs 136a and 136b. For example, a width of the first negative electrode tab 136a disposed at the center portion of the electrode assembly 110 of the jelly-roll structure may be smaller than that of the second negative electrode tab 136b disposed at the outer circumference of the electrode assembly 110. In addition, a thickness of the first negative electrode tab 136a may be smaller than a thickness of the second negative electrode tab 136b. In an implementation, the negative electrode tabs 136a and 136b may have the same range of widths and thicknesses as the positive electrode tabs 135a and 135b.

Figure 5:
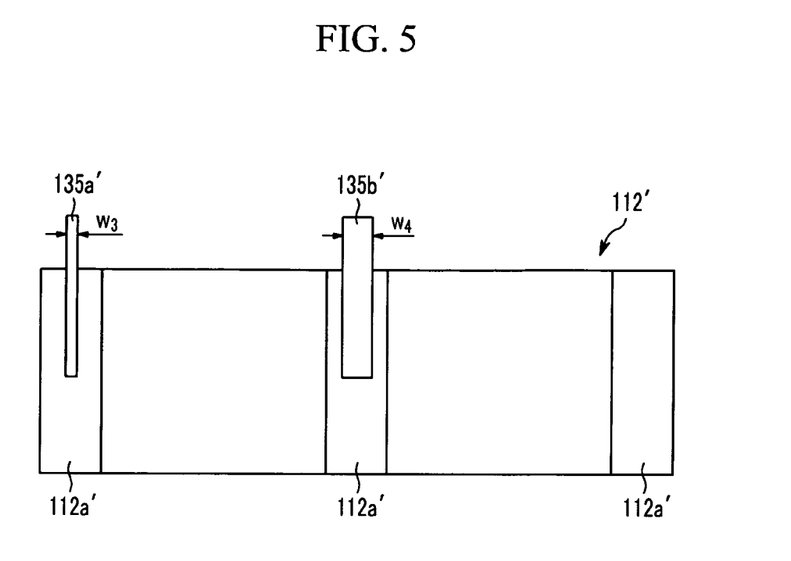
FIG. 5 illustrates a schematic view of an electrode assembly according to another embodiment.

FIG. 5 illustrates a schematic view of an electrode assembly according to another embodiment. For example, FIG. 5 illustrates an expanded view of a positive electrode 112' of the electrode assembly according to another embodiment. A repeated description of the same configurations as those of the previous embodiment is omitted.

Referring to FIG. 5, the positive electrode 112' may have an elongated band shape. The positive electrode 112' may include a coating region in which the active material is coated and a positive electrode uncoated region 112a' in which the active material is not coated. The positive electrode uncoated region 112a' may be formed on end edges and on a center portion of the unfolded positive electrode 112'. A first positive electrode tab 135a' and a second positive electrode tab 135b' may be formed on or coupled to the positive electrode uncoated region 112a'. When the positive electrode 112' is spiral-wound along with the negative electrode and separator thereby forming the electrode assembly having the jelly-roll shape, the first positive electrode tab 135a' may be disposed at a center portion of the electrode assembly and the second positive electrode tab 135b' may be relatively closer to an outer circumference of the electrode assembly.

In the present embodiment, a width $w_3$ of the first positive electrode tab 135a' near the center portion of the electrode assembly may be smaller than a width $w_4$ of the second positive electrode tab 135b' near the outer circumference of the electrode assembly. In an implementation, the width $w_3$ of the first positive electrode tab 135a' may be similar to the width $w_1$ of the first positive electrode tab 135a in the previous embodiment. Also, the width $w_4$ of the second positive electrode tab 135b' may be determined as a value similarly to the width $w_2$ of the second positive electrode tab 135b of the previous embodiment when considering the disposed position thereof.

Like the previous embodiment, a thickness of the first positive electrode tab 135a' may be smaller than a thickness of the second positive electrode tab 135b'.

As described above, the thickness of the first positive electrode tab 135a' may be smaller than the thickness of the second positive electrode tab 135b' such that inner stress may be decreased at the center portion of the electrode assembly and deformation according thereto may be suppressed. Also, output current through the second positive electrode tab 135b' may be maximized.

In the above description, the structure of the positive electrode tabs 135a' and 135b' is described focusing on the positive electrode 112', however this may be equally applied to a negative electrode and negative electrode tabs (not illustrated).

When a positive electrode has the electrode structure of the previous embodiment, a corresponding negative electrode may have the electrode structure of the present embodiment. When a positive electrode has the electrode structure of the present embodiment, a corresponding negative electrode may have the electrode structure of the previous embodiment.

The positive electrode and the negative electrode may each have two tabs. However, in an implementation, the positive electrode and negative electrode may have additional tabs according to a desired power demand of the rechargeable battery. When forming at least three positive electrode tabs or negative electrode tabs, the width of the positive electrode tab or negative electrode tab nearest to the center portion of the electrode assembly may be the smallest. The width of the positive electrode tabs and/or the negative electrode tabs may gradually increase away from the center portion of the electrode assembly toward the outer circumference. Thus, the thickness of the positive electrode tab or the negative electrode tab nearest the outer circumference of the electrode assembly may be largest.

In addition, the thickness of the positive electrode tabs and/or the negative electrode tabs may gradually increase toward the outer circumference of the electrode assembly. Accordingly, the thickness of the positive electrode tabs and/or the negative electrode tabs closest to the center portion of the electrode assembly may be thinnest; and the positive electrode tab or the negative electrode tab closest to the outer circumference portion of the electrode assembly may be thickest.

According to the embodiments, despite a difference of curvature between a center portion and an outer circumferential portion of the jelly-roll structure, inner stress may be minimized in the center portion of the electrode assembly. For example, even when a multi-tab is used according to the demand for high power, one of the electrode tabs may be disposed on the center portion of the electrode assembly without an increase in inner stress. Thus, deformation of the electrode assembly may be prevented.

The embodiments provide an electrode assembly including a plurality of electrode tabs with different widths, thereby improving a structure of the electrode tab and minimizing inner stress.

The embodiments provide a rechargeable battery including an electrode assembly having a plurality of electrode tabs with different widths.

According to the embodiments, a structure of the electrode tab may be improved such that low resistance and high power may be maintained while simultaneously minimizing inner stress of the electrode assembly may be minimized.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. An electrode assembly, comprising:
a first electrode,
a second electrode, and
a separator interposed therebetween,
wherein:

the first electrode, the second electrode, and the separator are spiral-wound in a jelly-roll structure, the first electrode includes at least two first uncoated regions separated from each other by a coating region and includes a first tab on one of the first uncoated regions and a second tab on another of the first uncoated regions, the first tab and the second tab protruding from one side of the jelly-roll structure, the first tab is disposed at a center portion of the jelly-roll structure and the second tab is disposed closer to an outer circumference of the jelly-roll structure than the first tab, a width of the first tab is smaller than a width of the second tab, and a thickness of the first tab in a radial direction is smaller than a thickness of the second tab in the radial direction.

2. The electrode assembly as claimed in claim 1, wherein: the first electrode has a band shape, and the two first uncoated regions are disposed on end edges of the first electrode.

3. The electrode assembly as claimed in claim 1, wherein: the first electrode has a band shape, and the one of the first uncoated regions is on a center portion of the first electrode and the other of the first uncoated regions is on an end edge of the first electrode.

4. The electrode assembly as claimed in claim 1, wherein the width of the first tab equals $2\pi r \times 0.065$, r being a radius of the bottom surface of the jelly-roll structure.

5. The electrode assembly as claimed in claim 1, wherein the width of the first tab is about 2.8 mm to about 7 mm.

6. The electrode assembly as claimed in claim 1, wherein the width of the second tab equals $2\pi r \times 0.07$, r being a radius of the bottom surface of the jelly-roll structure.

7. The electrode assembly as claimed in claim 1, wherein the width of the second tab is about 5.1 mm to about 11 mm.

8. The electrode assembly as claimed in claim 1, wherein the thickness of the first tab is about 0.05 mm to about 0.15 mm.

9. The electrode assembly as claimed in claim 1, wherein the thickness of the second tab is about 0.1 mm to about 0.2 mm.

10. The electrode assembly as claimed in claim 1, wherein the first electrode is a positive electrode.

11. The electrode assembly as claimed in claim 1, wherein:
the second electrode includes at least two second uncoated regions separated from each other by another coating region and includes a third tab on one of the second uncoated regions and a fourth tab on another of the second uncoated regions, the third tab and the fourth tab protruding to a side opposite to the one side from which the first tab and the second tab protrude, the third tab is disposed at a center portion of the jelly-roll structure and the fourth tab is disposed closer to an outer circumference of the jelly-roll structure than the third tab, and a width of the third tab is smaller than a width of the fourth tab.

12. The electrode assembly as claimed in claim 11, wherein the width of the third tab equals $2\pi r \times 0.065$, r being a radius of the bottom surface of the jelly-roll structure.

13. The electrode assembly as claimed in claim 11, wherein the width of the fourth tab equals $2\pi r \times 0.07$, r being a radius of the bottom surface of the jelly-roll structure.

14. A rechargeable battery, comprising:
an electrode assembly, the electrode assembly including a first electrode, a second electrode, and a separator interposed therebetween;

a case for receiving the electrode assembly, and a cap assembly coupled with the case and electrically connected to the electrode assembly, wherein:
the first electrode, the second electrode, and the separator are spiral-wound in a jelly-roll structure having a cylindrical shape, the first electrode includes at least two first uncoated regions separated from each other by a coating region and includes a first tab coupled to one of the first uncoated regions and a second tab coupled to another of the first uncoated regions, the first tab and the second tab protruding from one side of the jelly-roll structure, the first tab is disposed at a center portion of the jelly-roll structure and the second tab is disposed closer to an outer circumference of the jelly-roll structure than the first tab, a width of the first tab is smaller than a width of the second tab, and a thickness of the first tab in a radial direction is smaller than a thickness of the second tab in the radial direction.

15. The rechargeable battery as claimed in claim 14, wherein:
the width of the first tab equals $2\pi r \times 0.065$, the width of the second tab equals $2\pi r \times 0.07$, and r is a radius of a bottom surface of the jelly-roll structure.

16. The rechargeable battery as claimed in claim 14, wherein:
the width of the first tab is about 2.8 mm to about 7 mm, and the width of the second tab is about 5.1 mm to about 11 mm.

17. The rechargeable battery as claimed in claim 14, wherein
the second electrode includes at least two second uncoated regions separated from each other by another coating region and includes a third tab on one of the second uncoated regions and a fourth tab on another of the second uncoated regions, the third tab and the fourth tab protruding to a side opposite to the one side from which the first tab and the second tab protrude, and the third tab is disposed at a center portion of the jelly-roll structure and the fourth tab is disposed closer to an outer circumference of the jelly-roll structure than the third tab, and a width of the third tab is smaller than a width of the fourth tab.

18. The rechargeable battery as claimed in claim 17, wherein:
the width of the third tab equals $2\pi r \times 0.065$, the width of the fourth tab equals $2\pi r \times 0.07$, and r is a radius of a bottom surface of the jelly-roll structure.

19. The rechargeable battery as claimed in claim 17, wherein a thickness of the third tab is smaller than a thickness of the fourth tab.

* * * * *